United States Patent [19]

Jordan et al.

[11] Patent Number: 5,036,799
[45] Date of Patent: Aug. 6, 1991

[54] HORSE FEEDING RACK AND METHOD

[76] Inventors: Mary C. Jordan; Ward Jordan, both of P.O. Box 1124, Turnersville, N.J. 08012

[21] Appl. No.: 498,091

[22] Filed: Mar. 22, 1990

[51] Int. Cl.$^5$ .............................................. A01K 5/01
[52] U.S. Cl. ...................................... 119/61; 248/311.2
[58] Field of Search ................... 119/18, 60, 61, 69; 248/153, 311.2, 312.1, 318

[56] References Cited

U.S. PATENT DOCUMENTS

| | | |
|---|---|---|
| 159,617 | 2/1875 | Spencer . |
| 488,851 | 12/1892 | Stock . |
| 692,382 | 2/1902 | Swinton . |
| 812,157 | 2/1906 | Thompson . |
| 1,879,332 | 9/1932 | Kulp ................................ 119/61 |
| 3,362,382 | 1/1968 | Frasier ............................. 119/58 |
| 4,011,951 | 3/1977 | Boyer .............................. 119/61 |
| 4,488,510 | 12/1984 | Lundgren, Sr. .................... 119/60 |
| 4,655,425 | 4/1987 | Wallace et al. .................. 248/311.2 |

FOREIGN PATENT DOCUMENTS

| | | | |
|---|---|---|---|
| 8751 | of 1904 | United Kingdom . | |
| 2113519 | 8/1983 | United Kingdom ................ | 119/61 |
| 2198928 | 6/1988 | United Kingdom ................ | 119/61 |

Primary Examiner—Robert P. Swiatek
Attorney, Agent, or Firm—Thomas A. Lennox

[57] ABSTRACT

A method and a feeding device to avoid the ailment of sand colic in horses including a fenced in area with a fence section that does not allow the horse to stick its head through the fence to reach the ground on the outside of the fence section. A feed bucket is supported on a holder on the outside of the fence section such that the horse must lean over the top rail of the fence to eat from the bucket and cannot reach any spilled feed on the ground. The feeding device includes a metal bracket with a circular ring in which the feed bucket fits with a horizontal support member to support the feed bucket from the bottom. The ring and support are welded to a bracket plate which in turn is attached to the fence post.

14 Claims, 2 Drawing Sheets

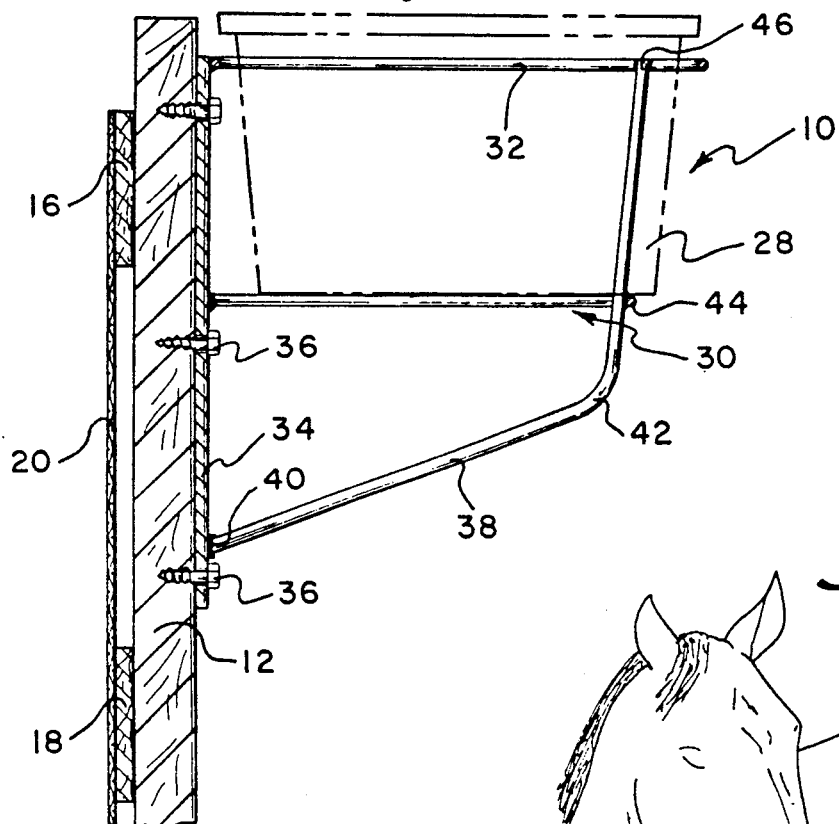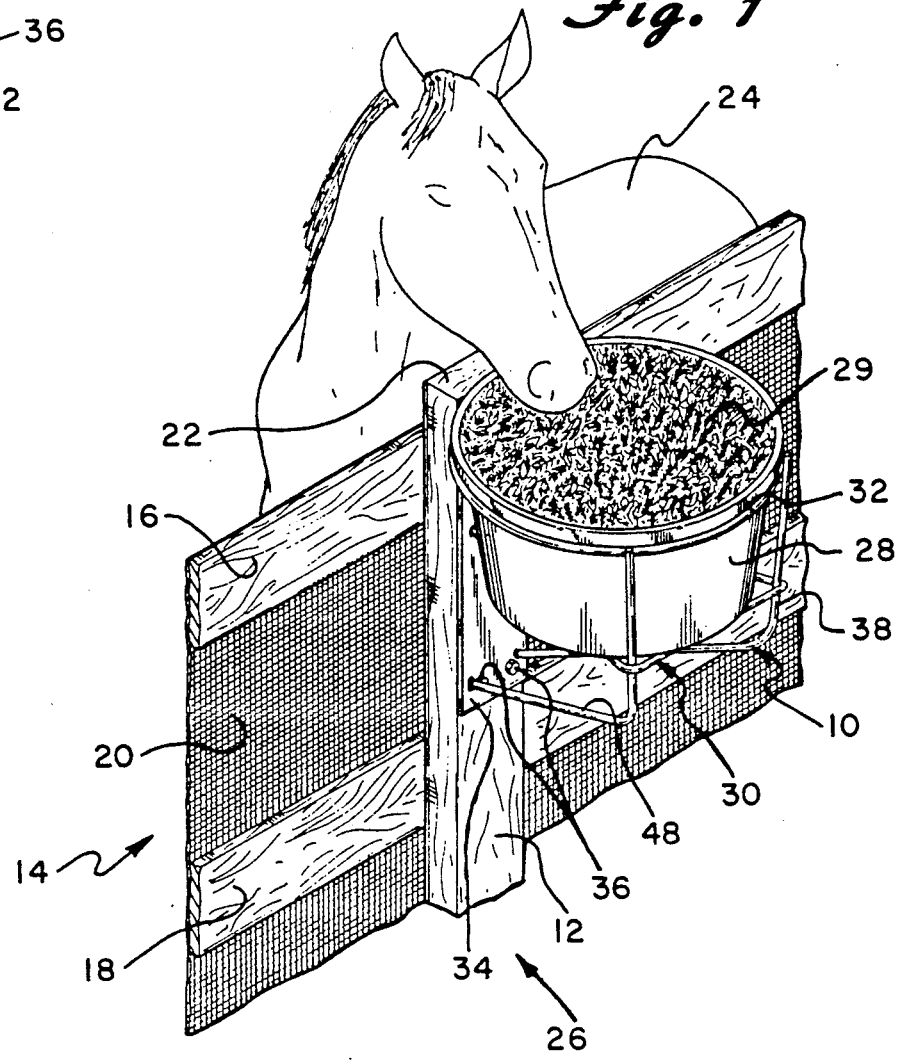

HORSE FEEDING RACK AND METHOD

BACKGROUND OF THE INVENTION

This invention involves a method of feeding and a device to facilitate feeding horses. Specifically, this invention involves a method to allow horses to ingest feed, while avoiding the danger of a condition known as sand colic.

The raising of horses is a major industry as well as a hobby or major avocation for many persons in the United States and around the world. The horses' life is spent mostly out of doors. Under the best of circumstances, when weather allows, the horse is most content when running free in a fenced in enclosure. It would be preferable for the horse to enter a building only to sleep at night. However, it is necessary, using present devices and methods, to bring the horses indoors when feeding. As a consequence, it is necessary for the owner or his agents to go outside, round up the horses and bring them indoors for each feedings. A horse is normally fed twice a day and it is desirable not to feed the horse just before the horse goes to sleep for health reasons. As a consequence, it is necessary to bring the horses in and then let the horses out into an open area after feeding. This requires inconvenient personal time for the hobbyist and a substantial manpower cost for the professional horse breeder.

Although many domesticated animals are fed outdoors, horses commonly contract "sand colic" if they eat outdoors. This condition may be lethal and at best is a serious illness. The condition is contracted during the eating process. The nature of the granular feed and the horses' eating habits typically spill a substantial amount of food on the ground. The horse, upon finishing the feed in the feed bucket will then proceed to eat any food that has dropped on the ground. Unless the ground is absolutely clean of dirt, the horse, must of necessity, eat a substantial amount of sand and dirt. This causes sand colic and results in the death of hundreds, if not thousands, of horses each year.

Certain types of devices have been proposed, including restraints which prevent the horse from removing its head from the feed pail. This and other solutions are not practical and further do not satisfy the objects above nor attain the objects described herein below.

SUMMARY OF THE INVENTION

It is an object of the invention to provide a device and method that allows feeding the horse while essentially preventing the possibility of sand colic ailing the horse.

It is a further object of the present invention to provide a method which allows the horse to eat out of doors while preventing the horse from feeding off the ground any food that is spilled.

It is an additional object of the present invention to provide a device that supports a feed bucket of standard structure on standard fence posts of a construction that the feed bucket can be located on the outside of the fenced in area where the horse runs.

It is a further object of the present invention to provide a feeding device which is located on the outside of the fenced in area such that a person can move along the outside periphery of the fenced in area filling the feed buckets without entering the fenced in area.

An aspect of the invention is a method to feed horses that includes providing an outdoor area with enclosure means to prevent the horse from leaving the area, the enclosure means including a section of fence including a vertical inside surface, facing the area where the horse can stand and a vertical outside surface, facing outside ground where the horse cannot stand. The method further includes providing the section of fence with a height sufficient to allow the horse to extend its head over a top edge of the fence. The method also includes providing protection means on or as part of the section of fence to prevent the horse from sticking its head through the section of fence to reach its mouth to the outside ground. The method further includes attaching a feed bucket support means on the section of fence, to hold and support a feed bucket outside the outside surface of the section of fence at height to allow the horse to eat feed from the bucket. The method finally includes placing a feed bucket in the feed bucket support means, and placing feed in the feed bucket.

Other aspects of the method provide that the attaching the feed bucket support means includes attaching said means on the outside surface of the section of fence. It is preferred that the providing protection means include attaching a panel of metal screen on the fence section proximate the feed bucket support means.

Another aspect of the invention is a device to hold feed for horses that includes a container to hold the feed that includes a bottom, an open top, and a continuous substantially vertical side wall extending upwardly a height from an outside edge of the bottom to a top peripheral edge of the side wall. The device further includes a frame holder to hold the container that includes container support means to provide vertical support for the bottom of the container. The device further includes a peripheral frame member attached essentially horizontally above the container support means, and having a shape and size larger than the outside surface of the vertical side wall of the container and sufficiently small to prevent the container from becoming dislodged from the container support means. The vertical distance from the height of the horizontal support of the container support means to the height of the peripheral frame member is less than the height of the vertical side wall. The device further includes attachment means to attach the frame holder to a fence.

It is preferred that the bottom and open top of the container and the peripheral frame member are all circular. It is further preferred that the attachment means include a vertical plate member structurally attached to the frame holder and plate attachments means to attach the plate to the side of a fence post. It is also preferred that the frame holder a vertical plate member, plate attachment means to attach the plate to the side of a fence post, a circular frame member structurally attached in an essentially horizontal alignment to the plate member, at least one horizontal bucket support member structurally attached at one end to the plate member at a distance below the circular frame member, and member support means comprising at least one structural member attached to the plate member to structurally support the circular frame member and the horizontal bucket support member. It is further preferred that the horizontal bucket support member of the frame holder include an integral unit member with two ends attached to the vertical plate, median sections diverging from each other with ends distant from the vertical plate connected to and continuing to a center section held horizontally and parallel to the vertical plate. It is also preferred that the member support means comprises two "L" shaped members, each with one end of a first leg attached horizontally to the vertical plate with the other end on the second leg aimed upwardly, wherein the other end is attached to the circular frame member and a median position of the second leg is attached to the horizontal bucket support member to form an integral frame holder.

BRIEF DESCRIPTION OF DRAWINGS

FIG. 1 is a perspective view of a device of the present invention further illustrating a method of the present invention wherein the device is attached on a fence post outside of an enclosure area where the horse runs.

FIG. 2 is a vertical cross-sectional view cutting along a vertical plane through the fence post normal to the fence line.

DESCRIPTION OF PREFERRED EMBODIMENTS

Figure 3:
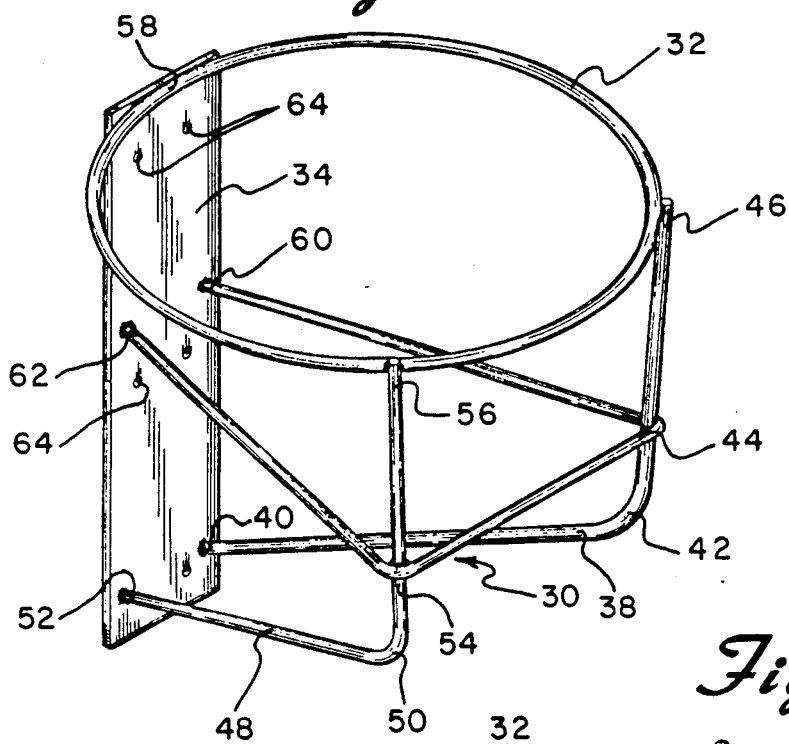
FIG. 3 is a left frontal and top perspective view of a feed bucket support device of the present invention as illustrated in FIG. 1.

As illustrated in FIG. 1, feeding device 10 is attached to vertical fence post 12 which is part of fence section 14 which separates and encloses an area where horse 24 is free to roam. This area where the horse can roam is separated from an area outside that area where the horse cannot roam and cannot reach. In this case, the area where the horse is free to roam is where horse 24 is standing, hidden in this view, while ground area 26 outside the enclosure is shown directly under device 10. Fence section 14 also includes upper horizontal fence rail 16 and lower horizontal fence rail 18, both structurally attached and supported on post 12. Metal screen 20 is attached to section 14 which prevents horse 24 from sticking its head between rails 16 and 18 to reach ground area 26 under device 10. An alternative is to increase the size or number of the rails in the fence section making the space between them small enough to prevent the horse from sticking its head between the horizontal members to reach ground area 26. In this diagram, horse 24 has its head over top 22 of post 12 to reach bucket 28 that is filled with granular feed 29. Is should be clear that even if top 22 were at a higher height, horse 24 can extend its head over the top rails on either side of the post to reach and feed from device 10. Further, it is quite satisfactory to attach device 10 at a lower height on post 12 as horse 24 can still extend its head over upper rail 16 and reach the food in device 10.

An alternative in the construction it would be common to provide that the top of rail 16 be about forty to forty-eight inches above the ground level. At this height, the horse can easily extend its head over the top of upper rail 16 to feed from the device of this invention. Of course this section of the fence may be modified to fit the particular size of the horse to be fed. Thus, if there is a small horse in the same area as a larger horse, the horses can be trained to go to separate sections of the fence for feeding.

Device 10 includes feed bucket 28 which rests on bucket support device 30 and is held in position by peripheral frame ring 32. Device 30 and ring 32 are welded to attachment plate 34 which is fixed to post 12 by lag bolts 36 extending through holes in plate 24 and engaging post 12 as illustrated in FIG. 2. This view, looking from the side shows right support member 38 which is essentially an "L" shaped member welded at lower end 40 to plate 34 with bend 42 extending the upper section essentially vertically to be welded at median section 44 to bucket support device 30 and at upper end 46 by a weld to ring 32. Left support member 48 is essentially identically welded together in the same fashion to plate 34, device 30, and ring 32.

Figure 4:
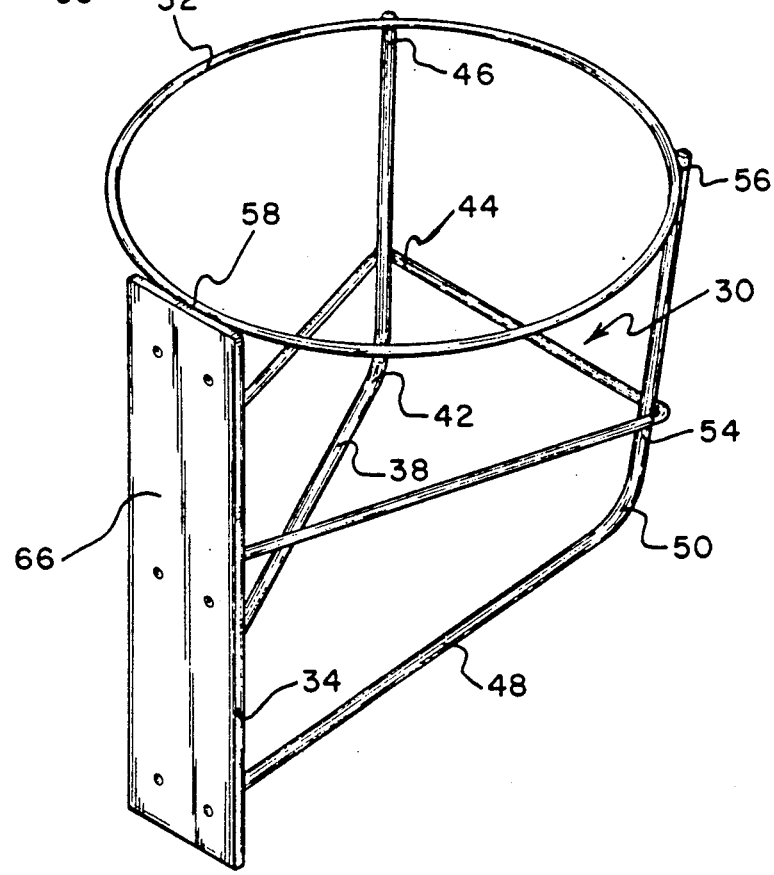
FIG. 4 is a rear left side upper perspective view of the feed bucket support device illustrated in FIG. 3.

As shown in FIGS. 3 and 4, left support member 48 is an "L" shaped one-quarter inch steel rod formed with bend 50 welded at lower end 52 to a lower section of plate 34. The upright portion of member 48 extends vertically welded at median section 54 to bucket support device 30 by a weld and at upper end 56 by a weld to ring 32. Ring 32 is welded directly to an upper edge of plate 34 at rear section 58 so that ring 32 is supported at three points, two by the upper ends of support members 38 and 48 and by a weld attachment at rear section 58 to plate 34. Bucket support device 30 is essentially a "U" shaped member welded at free ends 60 and 62 directly to a median vertical position on plate 34. The "U" shaped member 30 has median section 44 extending horizontally between the upright portions of support members 38 and 48 with the free ends of member 30 bending around the upright portions and extending horizontally toward plate 34. The upright portions of support members 38 and 48 are positioned inside those bends and welded at those sections of member 30. Holes 64 through plate 34 allow the plate to be attached vertically to the outside surface of fence post 12 abutting rear surface 66 against the fence post and attaching plate 34 with a plurality of stove bolts 36. The fence post may be wooden as shown in FIGS. 1 and 2 or may be the more modern aluminum or galvanized steel or fence posts requiring the use of holes in the fence post into which bolts 36 are threadably engaged. Device 30 is constructed entirely of one-quarter inch diameter round steel rod.

The dimensions of device 10 depend upon the size and shape of the feed bucket. The feed bucket may be round or may be flattened on one side, but it is preferred that standard shape and size feed buckets be used. A common feed bucket has a top edge diameter of about sixteen inches and a vertical height of about nine inches. For that bucket, it is then desirable to have ring 32 be about sixteen to seventeen inches inside diameter allowing the bucket to easily interfit into the opening. Likewise, for that size bucket, it would be preferred to have the vertical distance between ring 32 nd the resting surface of bucket support device 30 be about eight inches. In this configuration, the bucket rests solidly on device 30 and is prevented from inadvertent removal by ring 32.

Another embodiment of the present invention is to form ring 32 with a downwardly depending section and attach that rear section to plate 34. This is accomplished by breaking the ring and extending the free ends downwardly and then rearwardly toward plate 34. The free ends are inserted through holes in plate 34 and welded to form an integral unit. This places most of the periphery of ring 32 at a higher height than the attachment to plate 34. This configuration portions the feed bucket away from plate 34 such that the edge of the feed bucket is not resting on the top of plate 34, tending to make the bucket less secure in the holder. This also allows for the possibility the upper downwardly depending rim of the feed bucket to extend over and around the outside periphery of the modified ring 32 and not be restricted by the top of plate 34.

While this invention has been described with reference to the specific embodiments disclosed herein, it is not confined to the details set forth and the patent is intended to include modifications and changes which may come within and extend from the following claims.

We claim:

1. A method of feeding horses comprising:
   (a) providing an outdoor area with enclosure means to prevent the horse from leaving the area, the enclosure means comprising a section of fence comprising a vertical inside surface facing the area where the horse can stand and a vertical outside surface facing outside ground where the horse cannot stand,
   (b) providing the section of fence with a height sufficient to allow the horse to extend its head over a top edge of the fence,
   (c) providing protection means on or as part of the section of fence to prevent the horse from sticking its head through the section of fence to reach its mouth to the outside ground.
   (d) attaching a feed bucket support means on the section of fence, to hold and support a feed bucket outside the outside surface of the section of fence at a height to allow the horse to eat feed from the bucket.
   (e) placing a feed bucket in the feed bucket support means, and
   (f) placing feed in the feed bucket.

2. The method of claim 1 wherein the attaching the feed bucket support means comprises attaching said means on the outside surface of the section of fence.

3. The method of claim 1 wherein the providing protection means comprises attaching a panel of metal screen on the fence section proximate the feed bucket support means.

4. The method of claim 1 wherein the feed bucket comprises a container to hold the feed comprising:
   (i) a bottom,
   (ii) an open top, and
   (iii) a continuous substantially vertical side wall extending upwardly a height form an outside edge of the bottom to a top peripheral edge of the side wall.

5. The method of claim 4 wherein the feed bucket support means comprises a frame holder to hold the container comprising:
   (a) container support means to provide vertical support for the bottom of the container, and
   (b) a peripheral frame member attached essentially horizontally above the container support means, and having a shape and size larger than the outside surface of the vertical side wall of the container and sufficiently small to prevent the container from becoming dislodged from the container support means,
   wherein the vertical distance from the height of the container support means to the height of the peripheral frame member is less than the height of the vertical side wall.

6. The method of claim 5 wherein the peripheral frame member is circular.

7. The method of claim 5 wherein the frame holder comprises a vertical plate member to which all other members are attached and attaching the feed bucket support means comprises attaching the vertical plate member to a side of a fence post of the section of fence.

8. The method of claim 5 wherein the peripheral frame member is a circular frame member, the container support means comprises at least one horizontal bucket support member, and frame holder further comprises:
   (a) a vertical plate member,
   (b) plate attachment means to attach the plate member to the side of a fence post,
   (c) the circular frame member structurally attached in an essentially horizontal alignment to the plate member,
   (d) the at least one horizontal bucket support member structurally attached at one end to the plate member at a distance below the circular frame member, and
   (e) member support means comprising at least one structural member attached to the plate member to structurally support the circular frame member and the at least one horizontal bucket support member.

9. The method of claim 8 wherein the at least one horizontal bucket support member of the frame holder comprises an integral unit member with two end sections with first ends attached to the vertical plate member and diverging form each other with second ends distant from the vertical plate member connected to and continuing to a center section held horizontally and parallel to the vertical plate member.

10. The method of claim 8 wherein the member support means comprises two "L" shaped members, each with one end on a firs leg attached horizontally to the vertical plate member with the other end on the second leg aimed upwardly, wherein the other end is attached to the circular frame member and a median position of the second leg is attached to at least one horizontal bucket support member to form an integral frame holder.

11. The method of claim 4 wherein the bottom and open top of the container are circular.

12. A device to hold feed for horses comprising:
   (a) a container to hold the feed comprising:
      (i) a bottom,
      (ii) an open top, and
      (iii) a continuous substantially vertical side wall extending upwardly a height from an outside edge of the bottom to a top peripheral edge of the side wall,
   (b) a frame holder to hold the container comprising:
      (i) a vertical plate member,
      (ii) container support means to provide vertical support for the bottom of the container comprising an integral unit member with two end sections with first ends attached to the vertical plate member and diverging from each other with second ends distant from the vertical plate member connected to and continuing to a center section held horizontally and parallel to the vertical plate member,
      (iii) a peripheral circular frame member structurally attached to the plate member essentially horizontally above the container support means, and having a shape and size larger than the outside surface of the vertical side wall of the container and sufficiently small to prevent the container from becoming dislodged from the container support means,
      wherein the vertical distance form the height of the container support means to the height of the circular frame member is less than the height of the vertical side wall, and
   (c) plate attachment means to attach the plate member to the side of a fence post.

13. The device of claim 12 wherein the bottom and open top of the container are circular.

14. The device of claim 12 further comprising member support means to structurally support the circular frame member and the container support means and comprising two "L" shaped members, each with one end on a first leg attached horizontally to the vertical plate member with the other end on the second leg aimed upwardly, wherein the other end is attached to the circular frame member.

* * * * *